Dec. 9, 1969 J. L. DE KROES ETAL 3,483,332
PUSH-BUTTON SIGNALLING MEMBERS
Filed May 9, 1966
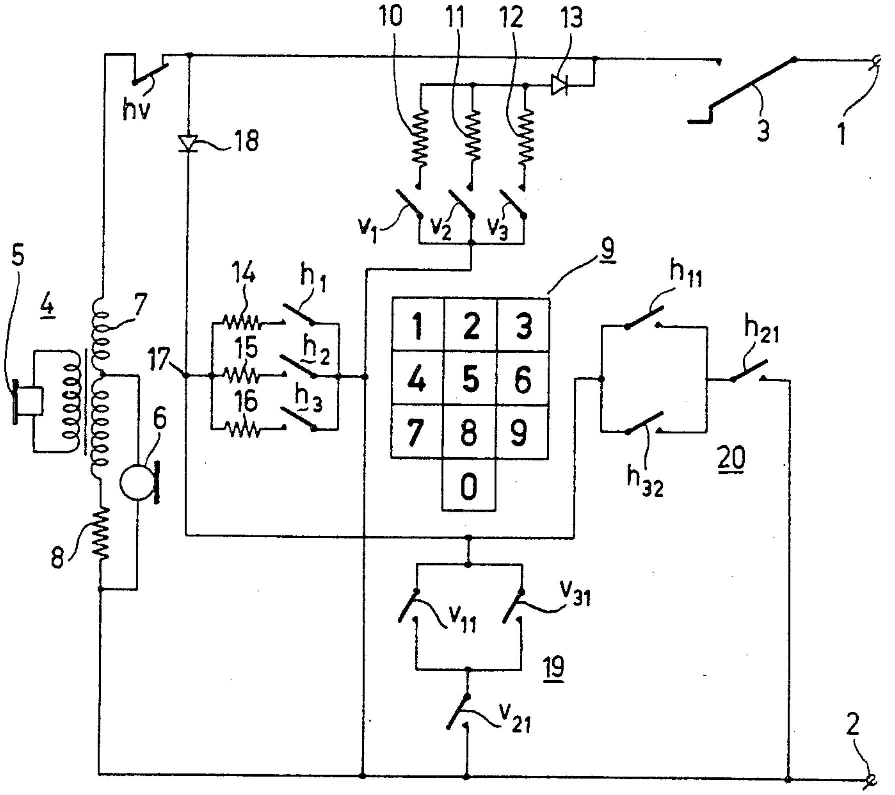
JAN L. de KROES
WILLEM van EIJK
INVENTORS
BY
AGENT United States Patent Office 3,483,332

Patented Dec. 9, 1969

3,483,332

PUSH-BUTTON SIGNALLING MEMBERS

Jan Louis de Kroes, Hilversum, and Willem van Eijk, Leidschendam, Netherlands, assignors, by mesne assignments, to U.S. Philips Corporation, New York, N.Y., a corporation of Delaware Filed May 9, 1966, Ser. No. 548,582
Claims priority, application Netherlands, May 19, 1965, 6506342
Int. Cl. H04m *1/26*
U.S. Cl. 179—90 6 Claims

ABSTRACT OF THE DISCLOSURE

The invention relates to a push-button telephone signalling device for signalling the number information. Additional push-button contacts are provided which in common form a short-circuit across the telephone line if two adjacent push-buttons are erroneously depressed. The use of such a signalling device has the advantage that the loss of time due to manipulation errors is minimized and that undesired connections are not established.

The invention relates to a push-button signalling device for signalling number information, said device comprising push-buttons and push-button contacts controlled thereby and a plurality of resistors adapted to be switched on by the push-buttons and two rectifiers, in which by the depression of each button two resistors associated herewith are connected, in series with one rectifier each, in parallel opposition between two output terminals.

Such devices are employed inter alia in subscriber sets of automatic telephone systems.

The invention has for its object to provide a push-button signalling device of the kind set forth, in which the number signalling is protected from manipulation errors, whilst the construction is extremely simple.

A push-button signalling device according to the invention is characterized in that further push-button contacts are provided which in common form a short-circuit via a rectifier, whilst by the depression of two neighbouring push-buttons the short-circuit passing current in the pass direction of the rectifier is connected between the output terminals.

The use of such a signalling device has the advantage that the loss of time due to manipulation errors is minimized and that undesired connections are not established.

The invention and its advantages will be described more fully with reference to the drawing.

The drawing shows a simplified circuit diagram of a telephone set and the associated push-button signalling device. In operation, the terminals 1 and 2 of the set are connected to the conductors of a subscriber line (not shown), which leads to a telephone exchange. In this telephone exchange the subscriber line is fed by a direct voltage source having such a polarity that the potential of the terminal 2 is positive relative to that of the terminal 1. When the receiver contact 3 is closed, the speech circuit 4 is connected to the terminals 1 and 2 and a current will flow through the subscriber line. This speech circuit is formed in a conventional manner by a telephone 5, a microphone 6, a transformer 7 and a line balance 8.

Dialling is performed by means of a keyboard 9 with the keys 0 to 9 provided thereon. These push-buttons control in a manner not further decribed push-button contacts which are associated with the push-buttons along coordinates and they control, moreover, a common break contact *hv*. In one co-ordinate direction contacts *h*1 and *h*11 are associated with the keys 1, 2 and 3, the contacts *h*2 and *h*21 with the keys 4, 5 and 6 and the contacts *h*3 and *h*32 with the keys 7, 8 and 9. In the other co-ordinate direction the contacts *v*1 and *v*11 are associated with the keys 1, 4 and 7, the contacts *v*2 and *v*21 with the keys 2, 5 and 8 and 0 and the contacts *v*3 and *v*31 with the keys 3, 6 and 9.

A resistor 10 is connected in series with the contact *v*1, a resistor 11 with the contact *v*2 and a resistor 12 with the contact *v*3. These resistors have different values, for example 1000 ohms, 2700 ohms and 7500 ohms respectively. The three series combinations are connected in parallel with each other and are connected on one side to the terminal 2 and on the other side to one side of the receiver contact 3, through a rectifier 13.

A resistor 14 is connected in series with the contact *h*1, a resistor 15 with the contact *h*2 and a resistor 16 with the contact *h*3. These resistors have different values, for example 1000 ohms, 2700 ohms and 7500 ohms respectively. The resistors 10 to 12 and 14 to 16 are pairwise identical to each other. The three series combinations are connected in parallel with each other and are connected on one side to the terminal 2 and on the other side (point 17) to one side of the receiver contact 3 through a rectifier 18.

When the hook contact is closed, prior to the start of dialling a signal receiver in the telephone exchange is connected to the subscriber line through a direct connection. This signal receiver takes over the current supply to the subscriber line and supplies a direct voltage of such polarity to the subscriber line that the potential of the terminal 2 is positive with respect to that of the terminal 1. The rectifier 13 is polarised so that it can convey current only when the potential of the terminal 2 is positive relative to the terminal 1, that is to say when the supply voltage has its normal polarity. The rectifier 18 is polarised in the opposite direction as compared with the rectifier 13 and can therefore convey current only when the polarity of the supply voltage is inverted.

By depressing an arbitrary push-button the push-button contacts associated with the push-button in both co-ordinates are closed and, at the same time, the common break contact *hv* is opened. For example by depressing the key 6 the contacts *v*3 and *h*2 are closed. The contact *v*3 switches on the resistor 12 and the contact *h*2 switches on the resistor 15.

When the break-contact *hv* is opened, the speech circuit is switched off. The supply voltage maintains its normal polarity, so that the resistor switched on by the contact *v*1, *v*2 or *v*3 becomes operative. This resistor has a much higher value than the direct-current resistance of the speech circuit (200 ohms). The resulting decrease in line current is an indication for the signal receiver that a digit is being selected. The signal receiver can divide the line current into a given number of current ranges corresponding to the various resistor values. When the line current is associated with a given current range, the value of the resistor switched on is determined. In the present case five current ranges can be distinguished, which correspond to the resistance values of 0 ohm, 1000 ohms, 2700 ohms, 7500 ohms and infinite. When the hook contact is closed prior to dialling the line current lies in the current range corresponding to the resistance value of zero ohm. By depressing a key, the line current decreases and lies in the current range corresponding to the resistance value of 1000 ohms, 2700 ohms or 7500 ohms. After the signal receiver has assessed the current range concerned, it inverts the polarity of the supply voltage within the period of time in which the key is depressed. As a result the resistor switched on by the contact *h*1, *h*2 or *h*3 becomes operative or the infinite resistor, when none of the contacts *h*1 to *h*3 is closed. The latter occurs when the digit 0 is dialled, in which case only the contact *v*2 is closed. After the inversion of polarity the line current lies in the current range corresponding to the resistance value of 1000 ohms, 2700 ohms, 7500 ohms or infinite. After the signal receiver has assessed the relevant current range, it inverts the polarity of the supply voltage again so that the latter reassumes its normal polarity. By the detection of the current ranges of the line current prior to and after the inversion of polarity the resistors switched on are de-determined and since they unambiguously characterize in common one key, the dialled digit is known. For protecting the push-button signalling device from manipulation errors the point 17 is connected through two contact networks 19 and 20 to the terminal 2. The contact network 19 is formed by the series combination of contact *v*21 and the parallel combination of the contacts *v*11 and *v*31. The contact network 20 is formed by the series combination of contact *h*21 and the parallel connection of the contacts *h*11 and *h*32.

When the subscriber selects the digits it may occur that by mistake two keys are depressed simultaneously. Signalling of a digit may thus be imitated, which may give rise to the establishment of undesired connections. In the present push-button signalling device the depression of two adjacent keys causes at least one of the contact networks 19 or 20 to form a short-circuit between the point 17 and the terminal 2. The term "adjacent keys" are to be understood to mean herein keys shifted over one place both in a horizontal and/or a vertical direction. For example by the simultaneous depression of keys 5 and 6 a short-circuit is formed by the contact network 19 via the series combination of the contacts *v*21 and *v*31 and by the simultaneous depression of the keys 6 and 9 by the contact network 20 via the series combination of the contacts *h*21 and *h*32. The keys 0 and 8 form an exception. When the digit 8 is dialled and the key 0 is simultaneously depressed, the resistors 11 and 16 are switched on, that is to say, the resistor 11 by the two keys in common and the resistor 16 only by the key 8. The key 0 does not close any of contacts *h*1 to *h*3, so that in spite of the simultaneous depression of the keys 0 and 8, the digit 8 is detected. The key 0 is arranged so that it is very unlikely that, when the digit 0 is dialled, the digit 8 should be depressed simultaneously, so that for the adjacent keys 0 and 8 no precautions are required like for the other adjacent keys.

The short circuit formed by the depression of two adjacent keys between the point 17 and the terminal 2 is parallel with the resistor(s) switched on by one or two of the contacts *h*1 to *h*3. When two keys are depressed simultaneously, like with the depression of one key, the line current decreases so that the signal receiver receives the information of a digit being dialled. Thereupon the signal receiver detects the current range of the line current concerned. Then the signal receiver inverts the polarity of the supply voltage. When two keys have been depressed simultaneously, the short circuit between point 17 and terminal 2 becomes operative via the rectifier 18, now conducting in the forward direction. The line current then lies in the current range corresponding to the resistance value of zero ohm. Normally, after the inversion of polarity, the line current lies in a current range corresponding to the resistance value of 1000 ohms, 2700 ohms, 7500 ohms or infinite owing to the fact that the value of zero ohm is not used for signalling a digit when the supply voltage has the inverse polarity. If the signal receiver assesses, after the inversion of polarity, that the line current lies in the current range corresponding to the resistance value of zero ohm, this is indicative of an error being made in dialling the digit. The use of the present push-button signalling device thus permits of detecting manipulation errors immediately after their occurrence. This has the advantage that undesired connections are not established and that the occupied connecting apparatus can be released in due time. After the detection of an error a tone may be transmitted to the subscriber for inviting him to restart dialling. The possibility of detecting manipulation errors means for the subscriber an appreciable economy of time, since otherwise only the establishment of an undesired connection or the non-establishment of a connection are indicative of an error committed in dialling.

A condition for detecting a manipulation error is that the signal receiver should assess, after the inversion of the polarity of the supply voltage, that the line current lies in the current range corresponding to the resistance value of zero ohm. A premature re-connection of the speech circuit due to a very transient contact with a key may also lead to fulfilling said condition. The use of the present push-button signalling device permits therefore also of detecting an insufficient depression of a key.

What is claimed is:

1. A signalling device comprising first and second terminals; a plurality of push-buttons arranged in adjacent rows and columns; a first plurality of switches coupled to said rows of said push-buttons respectively; a second plurality of switches coupled to said columns of said push-buttons respectively; means for varying the value of the impedance between said terminals comprising a plurality of circuits coupled to said pluralities of switches respectively and to said terminals; and means for indicating simultaneous operation of adjacent push-buttons by changing the value of said impedance to a value different from the values as determined by said varying means comprising a third plurality of switches coupled to said rows of said push-buttons respectively and to said terminals; and a fourth plurality of switches coupled to said columns of said push-buttons respectively and to said terminals.

2. A device as claimed in claim 1 further comprising means for connecting the alternate rows of said third plurality of switches in parallel with each other and the intermediate row in series with said alternate rows; and means for connecting the alternate columns of said fourth plurality of said switches in parallel with each other and the intermediate columns in series with said alternate columns.

3. A device as claimed in claim 1 wherein each of said plurality of circuits comprises resistors.

4. A device as claimed in claim 3 wherein each of said plurality of circuits further comprises a rectifier coupled in series with said terminals and said resistors respectively, said rectifier being poled in opposite polarity with respect to said terminals.

5. A device as claimed in claim 4 wherein said third and fourth pluralities of switches are directly connected to one of said terminals and to one of said rectifiers.

6. A device as claimed in claim 1 wherein said rows and columns are each three in number.

References Cited

UNITED STATES PATENTS

| | | | |
|---|---|---|---|
| 2,428,016 | 9/1947 | Deakin | 179—90 |
| 2,438,496 | 3/1948 | Deakin | 179—90 |
| 2,440,249 | 4/1948 | Deakin | 179—90 |
| 2,596,025 | 5/1952 | Hjertstrand | 179—16 |

KATHLEEN H. CLAFFY, Primary Examiner

D. L. RAY, Assistant Examiner